United States Patent
Gao et al.

(10) Patent No.: US 12,420,788 B2
(45) Date of Patent: Sep. 23, 2025

(54) ADAPTIVE PATH FOLLOWING ALGORITHM FOR HEAVY-DUTY VEHICLES

(71) Applicant: Volvo Truck Corporation, Gothenburg (SE)

(72) Inventors: Yangyan Gao, Gothenburg (SE); Shammi Rahman, Lincoln (GB); Timothy Gordon, Lincoln (GB); Leon Henderson, Härryda (SE)

(73) Assignee: Volvo Truck Corporation, Gothenburg (SE)

( * ) Notice: Subject to any disclaimer, the term of this patent is extended or adjusted under 35 U.S.C. 154(b) by 56 days.

(21) Appl. No.: 18/561,365

(22) PCT Filed: May 9, 2022

(86) PCT No.: PCT/EP2022/062481
§ 371 (c)(1),
(2) Date: Nov. 16, 2023

(87) PCT Pub. No.: WO2022/248204
PCT Pub. Date: Dec. 1, 2022

(65) Prior Publication Data
US 2024/0227794 A1    Jul. 11, 2024

(30) Foreign Application Priority Data
May 25, 2021    (WO) .................. PCT/EP2021/063818

(51) Int. Cl.
*B60W 30/12*    (2020.01)
*B60W 30/045*    (2012.01)

(52) U.S. Cl.
CPC .......... *B60W 30/12* (2013.01); *B60W 30/045* (2013.01); *B60W 2300/125* (2013.01);
(Continued)

(58) Field of Classification Search
CPC ...... B60W 30/10; B60W 30/12; B60W 30/14; B60W 30/16; B60W 30/165; B60W 30/18072; B60W 30/18145
See application file for complete search history.

(56) References Cited

U.S. PATENT DOCUMENTS

| 2012/0283911 A1* | 11/2012 | Lee | .................. B60W 30/12 |
| | | | 701/41 |
| 2014/0180543 A1 | 6/2014 | Ueda et al. | |

(Continued)

FOREIGN PATENT DOCUMENTS

| CN | 102358287 A | 2/2012 |
| CN | 104960520 A | 10/2015 |

(Continued)

OTHER PUBLICATIONS

Coulter, R.C., "Implementation of the Pure Pursuit Path Tracking Algorithm," The Robotics Institute, Carnegie Mellon University, Pittsburgh, Pennsylvania, Jan. 1992, 15 pages.

(Continued)

*Primary Examiner* — John Kwon
(74) *Attorney, Agent, or Firm* — Withrow & Terranova, PLLC

(57) ABSTRACT

A method for controlling a heavy-duty vehicle to follow a reference path (P), the method comprising obtaining the reference path (P) to be followed by the vehicle, determining a goal point (G) along the path (P) to be used as a steering reference from a vehicle location (x) in vicinity of the path (P), where the goal point (G) is distanced along the path (P) by a preview distance (Dp) measured from a reference location (x, G0) associated with the vehicle location (x), where the preview distance (Dp) is determined at least partly based on a lateral deviation (y) of the vehicle location (x) from the reference path (P), such that the preview distance (Dp) increases with an increasing lateral deviation (y) from (Continued)

the reference path (P), and decreases with a decreasing lateral deviation (y), and controlling the vehicle on the basis of the goal point (G).

22 Claims, 5 Drawing Sheets

(52) U.S. Cl.
CPC ... *B60W 2510/20* (2013.01); *B60W 2520/125* (2013.01); *B60W 2552/30* (2020.02)

(56) References Cited

U.S. PATENT DOCUMENTS

| | | |
|---|---|---|
| 2015/0057835 A1 | 2/2015 | Streubel |
| 2015/0225017 A1 | 8/2015 | Takeda |
| 2019/0361449 A1 | 11/2019 | Ueno et al. |
| 2019/0375450 A1 | 12/2019 | Medagoda et al. |
| 2020/0149898 A1 | 5/2020 | Felip Leon et al. |
| 2020/0298859 A1 | 9/2020 | Ozay et al. |
| 2021/0041882 A1 | 2/2021 | Lacaze et al. |
| 2021/0097786 A1* | 4/2021 | LaBarbera ........... G05D 1/0088 |
| 2024/0227793 A1 | 7/2024 | Gao et al. |
| 2025/0065894 A1* | 2/2025 | Luo ................... B60W 50/0205 |

FOREIGN PATENT DOCUMENTS

| | | |
|---|---|---|
| CN | 107264621 A | 10/2017 |
| CN | 109407674 A | 3/2019 |
| CN | 110789530 A | 2/2020 |
| CN | 110850878 A | 2/2020 |
| CN | 111674393 A | 9/2020 |
| CN | 111674403 A | 9/2020 |
| CN | 111806437 A | 10/2020 |
| CN | 112000090 A | 11/2020 |
| DE | 102008043675 A1 | 5/2010 |
| EP | 1847442 A2 | 10/2007 |
| EP | 1847442 A3 | 9/2009 |
| EP | 2251238 A1 | 11/2010 |
| EP | 2644477 A1 | 10/2013 |
| EP | 2905204 A1 | 8/2015 |
| WO | 2016130719 A2 | 8/2016 |
| WO | 2016130719 A3 | 9/2016 |
| WO | 2018089898 A2 | 5/2018 |
| WO | 2018089898 A3 | 6/2019 |
| WO | 2019184179 A1 | 10/2019 |

OTHER PUBLICATIONS

Gordon, T.J. et al., "Automated Driver Based on Convergent Vector Fields," Proceedings of the Institution of Mechanical Engineers, Part D: Journal of Automobile Engineering, vol. 216, Issue 4, Apr. 2002, pp. 329-347.
Park, M.-W. et al., "Development of Lateral Control System for Autonomous Vehicle Based on Adaptive Pure Pursuit Algorithm," 2014 14th International Conference on Control, Automation and Systems (ICCAS 2014), Oct. 22-25, 2014, Gyeonggi-do, Korea, IEEE, 5 pages.
Semsar-Kazerooni, E. et al. "Multi-objective platoon maneuvering using artificial potential fields," IFAC PapersOnLine, vol. 50, Issue 1, Jul. 2017, Elsevier Ltd., 6 pages.
Song, M. et al., "Flow-field guided steering control for rigid autonomous ground vehicles in low-speed manoeuvring," Vehicle System Dynamics, vol. 57, No. 8, Sep. 2018, pp. 1090-1107.
International Search Report and Written Opinion for International Patent Application No. PCT/EP2021/063818, mailed Feb. 9, 2022, 13 pages.
International Search Report and Written Opinion for International Patent Application No. PCT/EP2022/063880, mailed Oct. 11, 2022, 14 pages.
International Search Report and Written Opinion for International Patent Application No. PCT/EP2022/062481, mailed Oct. 20, 2022, 18 pages.
International Preliminary Report on Patentability for International Patent Application No. PCT/EP2022/062481, mailed Dec. 5, 2022, 6 pages.
Examination Report for European Patent Application No. 22728440.3, mailed Nov. 6, 2024, 4 pages.

* cited by examiner

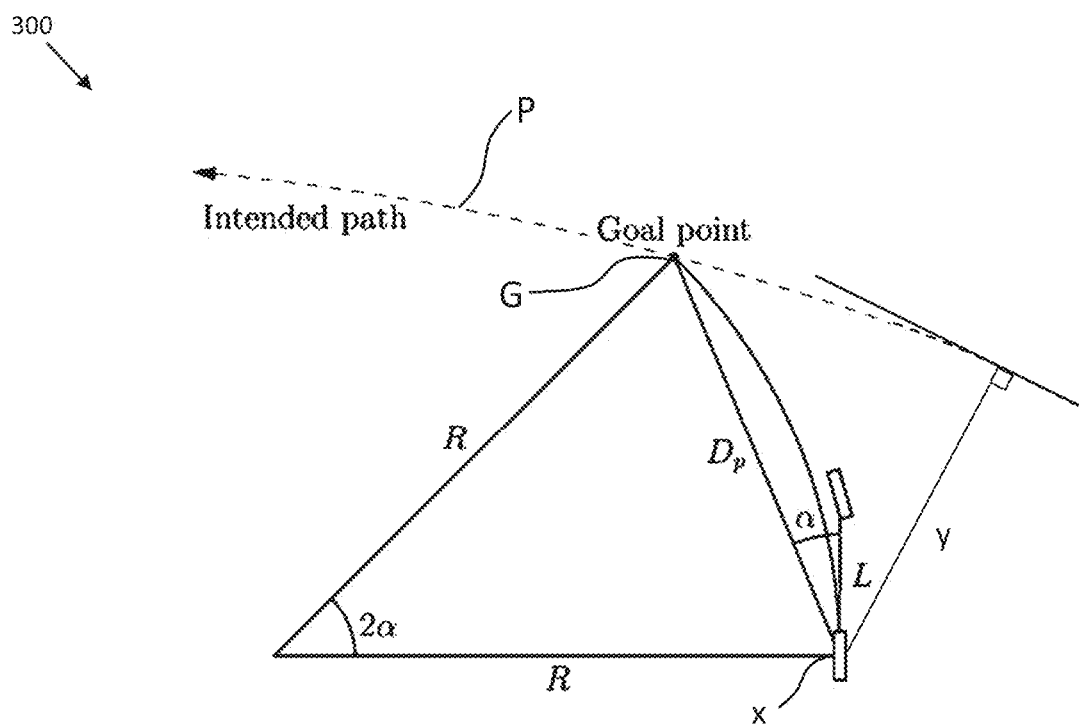
FIG. 3
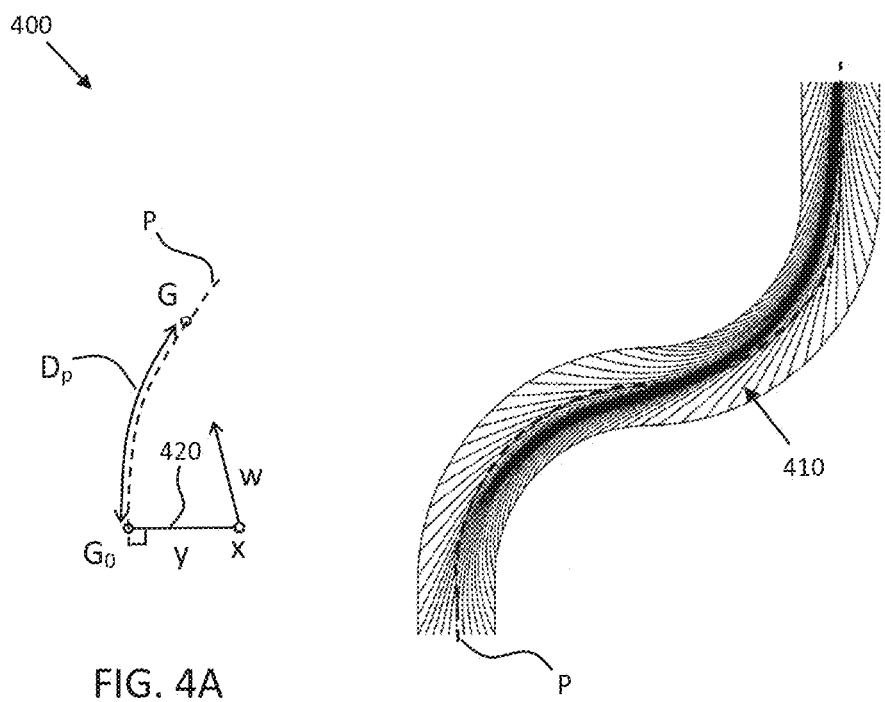
FIG. 4A
FIG. 4B

ADAPTIVE PATH FOLLOWING ALGORITHM FOR HEAVY-DUTY VEHICLES

This application is a 35 USC371 national phase filing of International Application No. PCT/EP2022/062481, filed May 9, 2022, which in turn claims priority to International Patent Application No. PCT/EP2021/063818, filed May 25, 2021, the disclosures of which are incorporated herein by reference in their entireties.

TECHNICAL FIELD

The present disclosure relates primarily to heavy-duty vehicles, such as trucks and semi-trailer vehicles, although the techniques disclosed herein can also be used in other types of vehicles. The disclosure relates in particular to path following methods for use in vehicle control which are based on a preview distance or lookahead distance.

BACKGROUND

Advanced driver assistance systems (ADAS) and methods for controlling autonomous drive (AD) by autonomous vehicles normally base vehicle control on some form of path following algorithm. The control system first determines a desired path to be followed by the vehicle, e.g., based on a current transport mission, together with map data indicating possible routes to take in order to navigate the vehicle from one location to another.

Path following is the process concerned with how to determine vehicle speed and steering at each instant of time for the vehicle to adhere to a certain target path to be followed. There are many different types of path following algorithms available in the literature, each associated with its respective advantages and disadvantages.

Pure pursuit is a well-known path following algorithm which can be implemented with relatively low complexity, it is described, e.g., in "Implementation of the pure pursuit path tracking algorithm", by R. C. Coulter, Carnegie-Mellon University, Pittsburgh PA Robotics INST, 1992. The algorithm computes a set of vehicle controls, comprising steering angle, by which the vehicle moves from its current position towards a point at a predetermined "preview" distance away along the path to be followed. The pure pursuit methods cause the vehicle to "chase" a point along the path separated from the vehicle by the preview distance, hence the name.

Vector field guidance is another path following algorithm which instead bases the vehicle control on a vector field, which vector field is also determined based on a preview distance or look-a-head parameter. Vector field guidance methods were, e.g., discussed by Gordon, Best and Dixon in the paper "An Automated Driver Based on Convergent Vector Fields", *Proc. Inst. Mech. Eng. Part D*, vol. 216, pp. 329-347, 2002.

US2014180543A1 discloses a vehicle control device, in which a basic steering amount calculation section calculates a basic steering amount to drive an own vehicle on a basic route along a driving lane. A posture detection section detects a vehicle posture state indicated by a lateral position and an angle of yaw. An offset distance detection section detects an offset distance between the basis route and the lateral position. A correction steering amount calculation section calculates a correction steering amount as a steering control amount to drive the own vehicle along a virtual correction route. The posture of the own vehicle is aligned with a predetermined target posture at a predetermined virtual target point by using the virtual correction route. An instruction steering amount calculation section calculates an instruction steering amount on the basis of the basic steering amount and the correction steering amount.

EP2251238A1 discloses a vehicle travel support device capable of continuing operation even when the recognition accuracy of a lane mark has been degraded.

The preview distance parameter plays an important role in the behaviour of these types of path following processes. There is a need for improved methods of determining this parameter, to make the path following methods more suitable for use with articulated heavy-duty vehicles.

SUMMARY

It is an object of the present disclosure to provide methods and control units for controlling a heavy-duty vehicle during a path following operation. This object is obtained by a method for controlling a heavy-duty vehicle to follow a reference path. The method comprises obtaining the reference path to be followed by the vehicle. The method also comprises determining a goal point along the path to be used as a steering reference from a vehicle location in vicinity of the path, where the goal point is distanced along the path by a preview distance measured from a reference location on the path associated with the vehicle location. The preview distance is, according to the disclosed method, determined at least partly based on a lateral deviation of the vehicle location from the reference path, such that the preview distance increases with an increasing lateral deviation from the reference path and decreases with a decreasing lateral deviation. The method also comprises controlling the vehicle on the basis of the goal point. This way, advantageously, the vehicle will adjust its path following behavior in dependence of its lateral deviation from the target path. If the vehicle is far from the target path laterally, then the vehicle will aim for a point further away on the target path compared to when the vehicle is closer laterally to the target path. This behavior will result in an improved path following performance by the vehicle.

According to aspects, the vehicle is controlled on the basis of the goal point in the sense that the vehicle is controlled towards the goal point, or in that the vehicle is at least intermittently controlled towards the goal point.

According to aspects, the method also comprises determining the preview distance at least partly based on a longitudinal velocity of the vehicle, such that the preview distance increases with an increasing longitudinal velocity. This additional dependence to velocity further improves the path following behavior by the vehicle.

According to aspects, the method further comprises determining the preview distance also based on a first tuning parameter, wherein a control effort for controlling the vehicle to follow the path increases with an increase in the first tuning parameter. This tuning parameter can be used to customize vehicle behavior. The vehicle path following behavior can also be fine-tuned for different vehicle types. Also, the path following behavior can be adjusted in dependence of, e.g., vehicle load. The first tuning parameter can, for instance, also be adjusted in dependence of a curvature of the reference path. This way vehicle path following in curves can be adjusted for an improved path following behavior.

The disclosed method may further comprise determining a centripetal lateral acceleration component associated with the reference path at the reference location and adjusting the first tuning parameter based on the centripetal lateral acceleration component. By adapting the first tuning parameter a according to an equation of the form $a=f(\kappa)$, where $\kappa$ is any measure of curvature of the target path, and $f(\kappa)$ can be an increasing function, an increased control effort is advantageously applied to path-following whenever greater precision is required.

A preview distance can for example be determined as $$D_p = \frac{U\,y}{\sqrt{2ay+b}}$$

where U is the longitudinal velocity of the vehicle, y is the lateral deviation, a is the first tuning parameter, and $b\geq 0$ is a second tuning parameter. This relatively simple expression can be evaluated with limited computational effort in real-time, which is an advantage.

Further advantages may be obtained by limiting the preview distance to a minimum preview distance $L_0$, for instance in accordance with the expression $$D_p = \max\left(\frac{U\,y}{\sqrt{2ay+b}}, L_0\right)$$

Where again U is the longitudinal velocity of the vehicle (100), y is the lateral deviation, a is the first tuning parameter, $b\geq 0$ is a second tuning parameter, and $L_0$ is the minimum preview distance. Parameter b is an adjustment parameter which can be used to modify the behavior close to the target path. Of course, other expressions $f(\cdot)$ involving one or more parameters can also be used for determining the preview distance, as $$D_p = \max(f(\cdot), L_0)$$

In some embodiments, the second tuning parameter b is a constant. In other embodiments, the second tuning parameter b is a function of the longitudinal velocity U of the vehicle. In particular, the second tuning parameter may be given by $$b = \left(\frac{\pi}{180}\right)^2 U^2.$$

The methods disclosed herein may advantageously be combined with vector field path following methods, of which artificial flow guidance methods represent a sub-set. For a straight target path, the vector field points directly at the preview point. More generally, on curves, the reference path can optionally be determined as $$w_1 = t_3 + \frac{t_1 - t_2}{2\cos\theta}$$

where $t_1$ is a unit-length tangent vector to the reference path evaluated at the reference location, $t_2$ is a unit-length tangent vector to the reference path evaluated at the goal point, $t_3$ is a unit-length vector directed from the vehicle location towards the goal point, and angle $\theta$ is half the angle between the two tangent vectors $t_1$ and $t_2$. This improves vehicle control when cornering. In later sections of the present disclosure, the expression $w_1$ will be referred to as the first flow field. Preferably, for the purpose of computing the vectors $t_2$ and $t_3$, the goal point is determined in accordance with a preview distance ($D_p$) which has been computed without enforcing any minimum preview distance $L_0$.

In further developments of the embodiments applying artificial flow guidance methods, the vehicle is controlled selectively on the basis of the current lateral deviation. More precisely, the vehicle may be controlled in accordance with the direction $w_1$ of the first flow field when the lateral deviation (y) exceeds a threshold ($y_{max}$), and in accordance with a direction $w_2$ of a second flow field, wherein the second flow field has a weaker restoring action than the first flow field. This remedies an oscillatory behavior which has been observed in specific situations, e.g., in sections of the reference path where the curvature is changing. In later sections of the present disclosure, the area defined by $|y|\leq y_{max}$ will be referred to as a boundary region of the reference path.

The methods disclosed herein are advantageously combined with, e.g., a pure pursuit-based path following algorithm, where the reference location equals the vehicle location, or a vector field guidance-based path following algorithm, where the reference location is a location on the path intersected by a straight line orthogonal to the path at the reference location through the vehicle location. The herein disclosed path following methods may also be advantageously used in vehicle applications comprising a Lane Keep Assistance (LKA) function, semi-autonomous drive, and/or autonomous drive.

There is also disclosed herein vehicles, computer readable media, and computer program products associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings:

FIG. 3 illustrates path following by a pure pursuit-based method;

FIGS. 4A-4B illustrate path following by a vector guidance-based method;

DETAILED DESCRIPTION OF EXAMPLE EMBODIMENTS OF THE INVENTION

Figure 1:
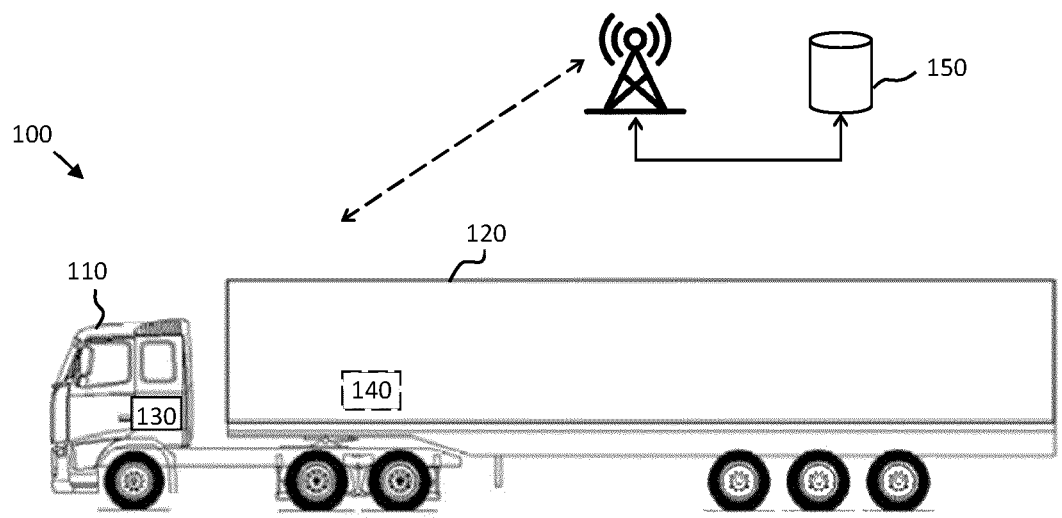
FIG. 1 schematically illustrates an example heavy-duty vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates an example vehicle 100 for cargo transport where the herein disclosed techniques can be applied with advantage. The vehicle 100 comprises a truck or towing vehicle 110 configured to tow a trailer unit 120 in a known manner. The example tractor 110 in FIG. 1 comprises a vehicle control unit (VCU) 130 configured to perform various vehicle control functions, such as path following and vehicle motion management. The trailer unit 120 may optionally also comprise a VCU 140. The vehicle 100 is optionally connected via wireless link to a remote server 150, which also comprises a control unit. The techniques disclosed herein may be performed by any of the control unit 130, 140, 150, or by a combination of one or more control units. An on-board VCU 130, 140 may also be parameterized by the remote server 150.

Figure 2:
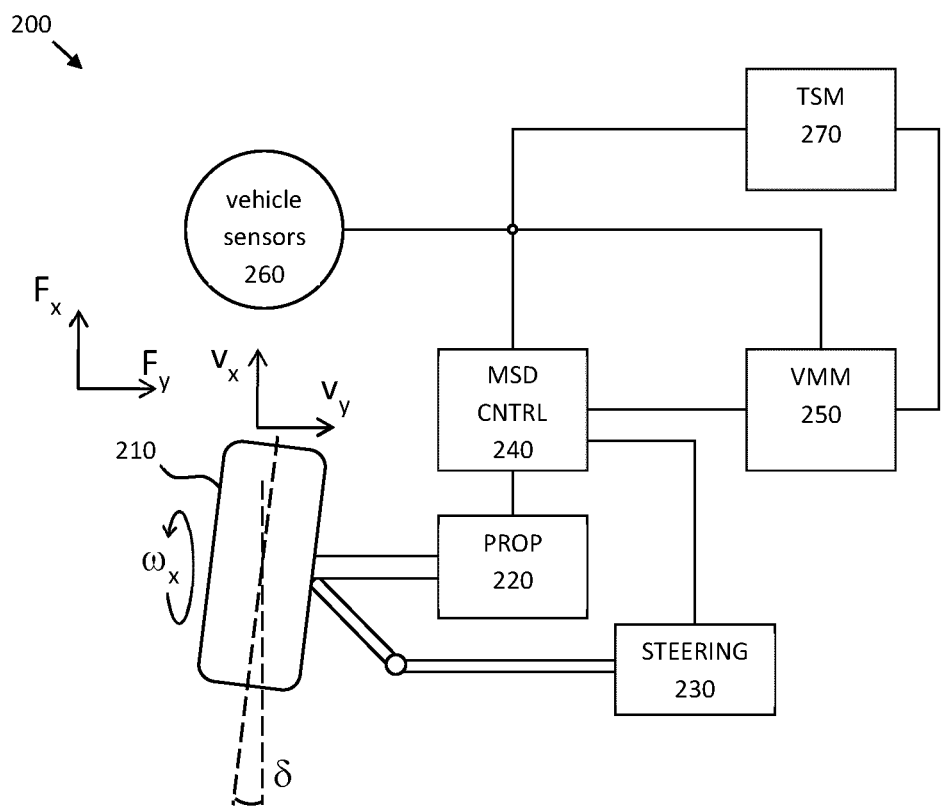
FIG. 2 shows a vehicle motion control system.

FIG. 2 schematically illustrates functionality 200 for controlling a wheel 210, e.g., on the tractor 110, by some example motion support devices (MSDs) here comprising a power steering arrangement 230 and a propulsion device 220 such as an electric machine (EM). The power steering arrangement 230 and the propulsion device 220 are examples of actuators which can be controlled by one or more MSD control units 240.

A traffic situation management (TSM) function 270 plans driving operations with a time horizon of, e.g., 1-10 seconds or so. This time frame corresponds to, e.g., the time it takes for the vehicle 100 to negotiate a curve. The vehicle manoeuvres, planned and executed by the TSM, can be associated with acceleration profiles and curvature profiles which describe a desired vehicle velocity and turning for a given manoeuvre. The TSM continuously requests the desired acceleration profiles $a_{req}$ and curvature profiles $c_{req}$ from a vehicle motion management (VMM) function 250 which performs force allocation to meet the requests from the TSM in a safe and robust manner and communicates requests to the different MSDs. The VMM function 250 manages both force generation and MSD coordination, i.e., it determines what forces that are required at the vehicle units in order to fulfil the requests from the TSM function 270, for instance to accelerate the vehicle according to a requested acceleration profile requested by TSM and/or to generate a certain curvature motion by the vehicle also requested by TSM. The forces may comprise e.g., yaw moments Mz, longitudinal forces Fx and lateral forces Fy, as well as different types of torques to be applied at different wheels.

Both the MSD control unit 240, the VMM function 250, and the TSM function 270 have access to sensor data from various on-board vehicle sensors 260, upon which vehicle control may be based. These sensors may comprise, e.g., global positioning system (GPS) receivers, vision-based sensors, wheel speed sensors, radar sensors and/or lidar sensors. The sensors are, among other things, configured to determine a vehicle location in relation to a reference path.

FIGS. 3, 4A, and 4B illustrate two example path following methods where at least some of the techniques disclosed herein may be used with advantage.

FIG. 3 shows an example 300 of how a pure pursuit algorithm may control a vehicle to follow an intended path or reference path P. The vehicle is located at a vehicle location x, at a lateral deviation y from the reference path P. It is appreciated that lateral deviation from a reference path may be determined in a number of different ways. The definition used herein is the distance from the vehicle location x to the reference path P along a line y orthogonal to the path P, as illustrated in FIG. 3. The general concepts disclosed herein are of course applicable also to other definitions of lateral deviation.

In the example 300 the vehicle has a wheel-base length L. The general idea behind the pure pursuit approach is to calculate the curvature that will take the vehicle from its current position x to a goal point G on the reference path P. The goal point is determined by defining a circle having radius R, such that the circle passes through both the goal point and the current vehicle position x. The vehicle is then controlled by a steering angle α determined in relation to this circle as shown in FIG. 3. The selection of the goal point P plays an important role in the behavior of the pure pursuit algorithm. The goal point is selected such that the distance from the vehicle location x to the goal point always equals a preview distance $D_p$.

Further details related to pure-pursuit algorithms of this type are given in "Implementation of the pure pursuit path tracking algorithm", by R. C. Coulter, Carnegie-Mellon University, Pittsburgh PA Robotics INST, 1992, and also in "Development of lateral control system for autonomous vehicle based on adaptive pure pursuit algorithm", Park, Myung-Wook, Sang-Woo Lee, and Woo-Yong Han, 14th International Conference on Control, Automation and Systems (ICCAS 2014), IEEE, 2014.

FIGS. 4A and 4B illustrate an example 400 of a vector field guidance-based path following method. In this method a vector field 410 is generated, and the vehicle is controlled according to the vector w at the current vehicle location x. Each vector w is determined such that it points from a location x towards a respective goal point G on the reference path P. The goal point is again determined based on a preview distance $D_p$, although now the preview distance is a distance measured along the reference path P from a reference location $G_0$ on the reference path P. This reference location $G_0$ is a location on the path P intersected by a straight line orthogonal to the path P at the reference location $G_0$ which also passes through the vehicle location x, as shown in FIGS. 4A and 4B. Vector field guidance-based methods were discussed by Gordon, Best and Dixon, in "An Automated Driver Based on Convergent Vector Fields", Proc. Inst. Mech. Eng. Part D, vol. 216, pp 329-347 (2002). The authors Song M, Wang N, Gordon T, and Wang J. also discuss vector field-based methods in "Flow-field guided steering control for rigid autonomous ground vehicles in low-speed manoeuvring", published in Vehicle System Dynamics, 2019 Aug. 3; 57(8): 1090-107. Some additional details related to vector field-based guidance are given by Semsar-Kazerooni, Elham et al., "Multi-objective platoon maneuvering using artificial potential fields" in: *IFAC-PapersOnLine* 50.1 (2017): 15006-15011.

A slightly more advanced version of a vector field guidance-based path following method will be discussed in connection to FIG. 7 below.

Both the pure pursuit and the vector field-based path following methods rely on a preview distance $D_p$, which is also sometimes referred to as a look-a-head distance. The preview distance relates to how distant the goal point is along the reference path P from the location of the vehicle. Intuitively, a short preview distance $D_p$ results in an increased control effort, i.e., more powerful steering control action, in order to reduce the lateral deviation y more quickly. A longer preview distance $D_p$ instead results in a smoother more slow control action, associated with a reduced control effort. A longer preview distance $D_p$ of course reduces the ability of the vehicle 100 to successfully negotiate corners and more sharp turns, which is a drawback.

Herein, the term control effort is to be interpreted as the amount of effort spent in bringing the vehicle closer to the track. Control effort may, e.g., be measured in terms of lateral acceleration, vehicle yaw rate, generated side-slip, applied steering angle magnitude, overall consumed energy by actuators on the vehicle, and the like.

Figure 5:
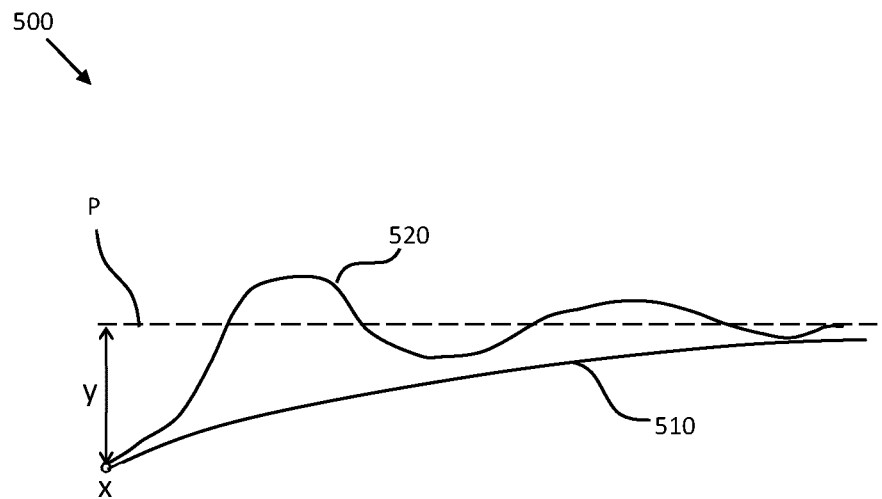
FIG. 5 exemplifies path following behavior for different preview distance settings.

FIG. 5 illustrates the effects of two different settings of the preview distance $D_p$ in following a straight reference path P, starting from a vehicle location x at a lateral deviation y from the path P. The example 510 shows what happens if the preview distance is selected relatively large, while the example 520 shows what happens if the preview distance is selected to be shorter.

The techniques disclosed herein improve the guidance of automated or semi-automated vehicles by adjusting the preview distance $D_p$ in dependence of the lateral offset (or deviation) y from the intended path P. Further improvements can be obtained by also altering the preview distance in dependence of the vehicle speed in the longitudinal direction, i.e., in the direction of vehicle heading.

Current path following methods suffer from incomplete and ad-hoc algorithms for setting preview distance $D_p$. For example, it has been proposed to be set $D_p$ proportional to speed, or as a function of some road curvature criteria. These adaptations are carried out to reduce preview distance when the curvature is high and increase preview distance when the curvature is low. However, current methods do not take account of lateral offset y from the target path P. This results in diminishing control effort and poor off-tracking performance when the vehicle is close to the target path, i.e., when the tracking error is comparably small. This has a negative effect on the off-tracking performance of articulated vehicles, such as the vehicle 100.

To improve path following performance when the vehicle is close to the reference path P, it is proposed to adjust the preview distance continuously based on an expanded set of criteria which also comprises lateral deviation y from the reference path. This reduces the problem of a low control effort near to the target path. In fact, for some scenarios the preview distance can be configured such as to result in a stable control effort independently of the current lateral deviation from the reference path P.

One of the novel technical features disclosed herein is to adapt the preview distance based on multiple criteria, with design parameters closely related to control effort. The path following methods are optionally based on vector field guidance, which constructs a vector field to provide a target motion direction (or acceleration), as exemplified in FIGS. 4A and 4B above.

Another feature of the methods disclosed herein is that the control effort can be regulated towards some desired control effort, or at least kept below a maximum desirable control effort. This control effort may be determined in dependence of a vehicle state or type, and potentially also in dependence of a road conditions, such as if the road friction is low or high. For instance, control effort may be reduced in scenarios with low road friction, and in case the vehicle carries heavy load.

Figure 6:
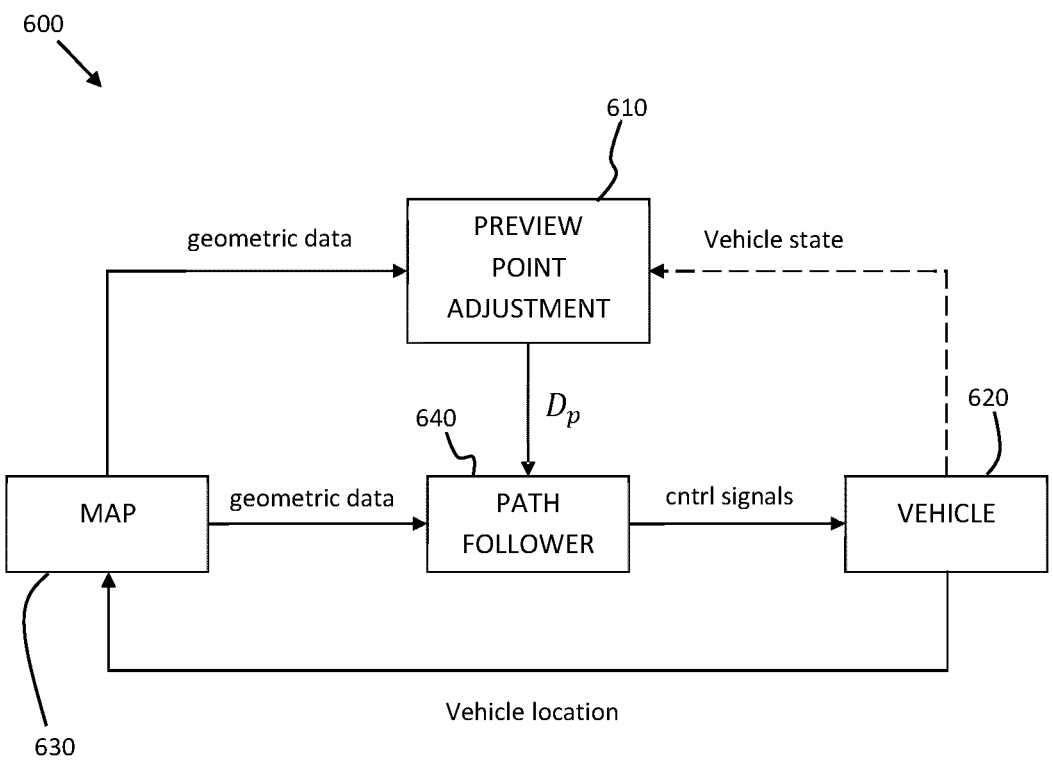
FIG. 6 schematically illustrates a vehicle control function architecture.

The techniques described herein may be arranged to operate as a 'preview point supervisor' which acts in real time according to speed, curvature and lateral offset (or deviation), as shown by the control architecture 600 exemplified in FIG. 6. A feedback loop from the vehicle 620 to the Preview Point Adjustment module 610 is shown as a dashed line; this is to indicate that only slowly changing variables such as speed and lateral offset are used; dynamic states such as yaw rate and body sideslip angle are not used, since adapting $D_p$ according to these states may interfere with the dynamic stability in the lower layer control loops, i.e., the control functions performed by the VMM 250 and or in the MSD control units 240 of the vehicle 100. In vector field guidance-based methods such as artificial flow guidance (AFG), only vehicle states associated the flow map are fed back on the dashed line.

The determined preview distance $D_p$ is sent to a path follower module 640, which may, e.g., implement a vector field-based path following method. The vehicle 100 is then controlled based on the generated reference data, in a known manner. Thus, as part of this control the path follower module transmits control signals to the various vehicle control units. In a pure pursuit-based path following strategy, the control signal comprises a steering angle command, while more generally it can comprise a curvature request and/or flow vector direction.

The preview point adjustment module 610 determines a current preview distance $D_p$ to use based on geometric data from a map function 630 and on the vehicle state signal. This preview distance is at least partly determined based on the lateral deviation y from the reference path P, such that the preview distance $D_p$ increases with an increasing lateral deviation y from the reference path P, and decreases with a decreasing lateral deviation y. In a pure pursuit algorithm, the lateral deviation y is determined as indicated in FIG. 3, while the lateral deviation in a vector field-based method is determined as indicated in FIGS. 4A and 4B. Of course, other ways of defining lateral deviation are also possible, where all methods have in common that the lateral deviation y is indicative of a lateral control error measured from the reference path laterally out to a vehicle location x in some way.

Figure 7:
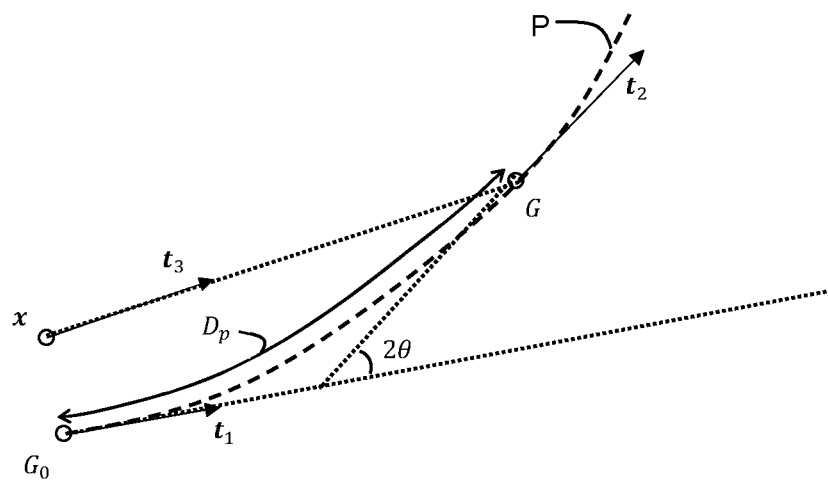
FIG. 7 shows a heavy-duty vehicle while cornering.

FIG. 7 illustrates path following when cornering, i.e., when the reference path P exhibits curvature. The methods disclosed herein may be used with advantage in vector-field guidance methods. In particular, the directions of the vectors w in the vector field can be adjusted in dependence of the path curvature, to avoid 'cutting curves'. For instance, the following relationship (first flow field) may be used to adjust the preferred direction of the vehicle when cornering $$w_1 = t_3 + \frac{t_1 - t_2}{2 \cos \theta}$$

Here $t_3$ is the unit-length vector pointing directly to the preview point, or goal point G, while $t_1$ and $t_2$ are unit-length tangent vectors at the local point $G_0$ and target point G respectively. Angle θ is half the angle between the two tangent vectors on the target path. This causes the flow vector $w_1$ to become tangent to the target path in the special case where
  (i) x is located on the target path, and
  (ii) the curvature of the target path is constant between $G_0$ and G.

Preferably, for the purpose of computing the vectors $t_2$ and $t_3$, the goal point is computed in accordance with a preview distance ($D_p$) for which no minimum preview distance $L_0$ is enforced. It is appreciated that the addition $$\frac{t_1 - t_2}{2 \cos \theta}$$

is a directional adjustment to the vector field which accounts for path curvature. In the special case $t_1 = t_2$ there is no curvature and also no adjustment to the direction of the vector $t_3$. The form of this equation is derived from the condition that w be tangent to the target path in all cases where the vehicle is positioned on the target path and the curvature is constant, including the case of zero curvature. The above equation remains valid in cases of variable curvature, though small deviations from tangency may occur. Similar concepts were discussed by Gordon, Best and Dixon in "An Automated Driver Based on Convergent Vector Fields", Proc. Inst. Mech. Eng. Part D, vol. 216, pp 329-347, 2002.

In further developments of the embodiments applying artificial flow guidance methods, the vehicle is controlled selectively on the basis of two distinct flow fields, wherein the selection is guided by the current lateral deviation y of the vehicle. More precisely, the vehicle may be controlled in accordance with the direction $w_1$ of the first flow field when the lateral deviation (y) exceeds a threshold ($y_{max}$), and in accordance with a direction $w_2$ of a second flow field, wherein the second flow field has a weaker restoring action than the first flow field. Accordingly, the vehicle will be controlled according to a deviation-dependent direction W(y) given by $$W(y) = \begin{cases} w_1, & |y| \leq y_{max}, \\ w_2, & |y| > y_{max}. \end{cases}$$

Clearly W(y) may further depend on the longitudinal position of the vehicle, which for simplicity is not made explicit in the notation used herein. The second flow field $w_2$ can be generated by interpolating S11 the first flow field and the tangent vector $t_1$ to the reference path (P) evaluated at the reference location ($G_0$). In some embodiments, the second flow field $w_2$ can be generated by interpolating the first flow field $w_1$ evaluated at the threshold lateral deviation $y_{max}$ and the tangent vector $t_1$ evaluated at the reference location ($G_0$). Further, the second flow field $w_2$ can be generated in such manner that it tends asymptotically to said tangent vector $t_1$ as the lateral deviation (y) decreases to zero. In a specific example, the direction of the second flow field is given by $$w_2 = (\cos \Gamma, \sin \Gamma),$$

where the orientation Γ is given by $$\Gamma = \angle t_1 + \frac{|y|}{y_{max}} \angle w_1|_{y_{max}},$$

$\angle t_1$ is the orientation of said tangent vector evaluated at the reference location ($G_0$) and $\angle w_1|_{y_{max}}$ is the orientation of the first flow field evaluated for the threshold lateral deviation ($y_{max}$). Accordingly, the second flow field $w_2$ will at all times be oriented between the first flow field and the tangent vector $t_1$ evaluated at the reference location ($G_0$).

Figure 8:
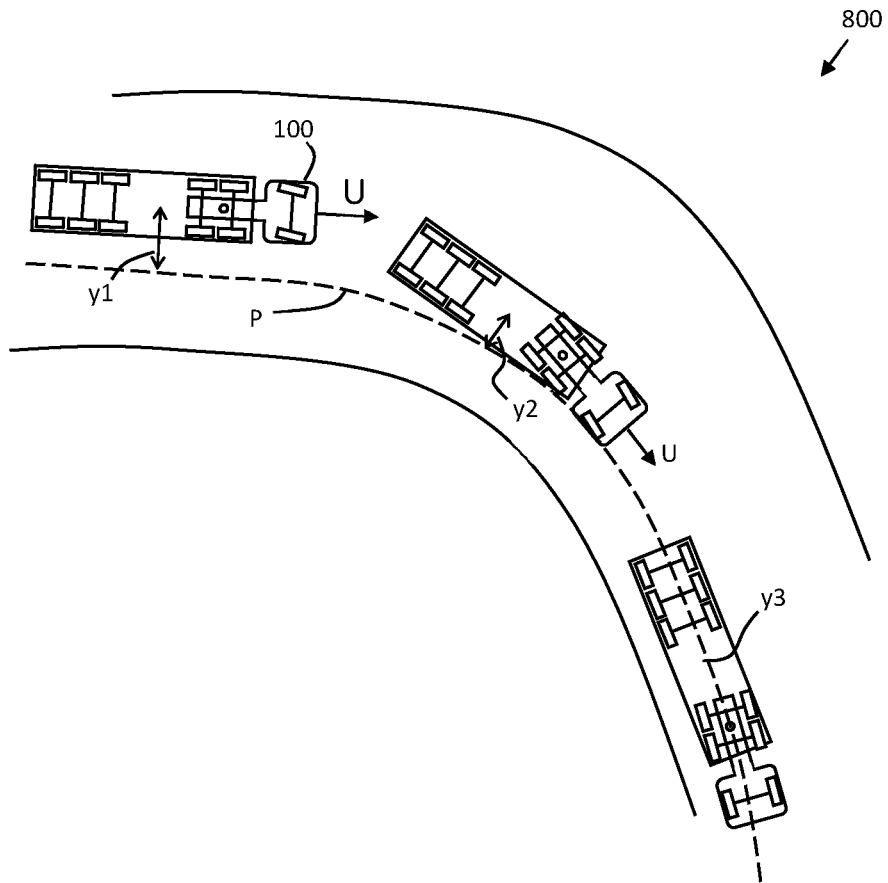
FIG. 8 illustrates path following of a curved path.

FIG. 8 illustrates an example scenario 800 where a heavy-duty vehicle 100 maneuvers along a reference path P through a curve. The vehicle 100 has a longitudinal velocity U, and starts out at an initial lateral deviation y1, which then decreases to y2 and further decreases to y3.

Figure 9:
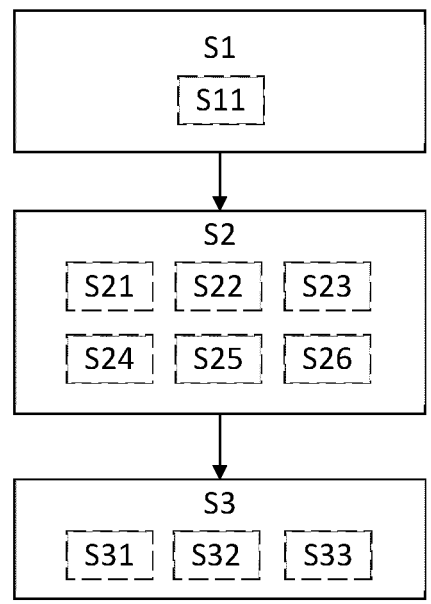
FIG. 9 is a flow chart illustrating methods.

FIG. 9 is a flow chart which illustrate methods that summarize the above discussion. There is illustrated a method for controlling a heavy-duty vehicle 100 to follow a reference path P. The method comprises obtaining S1 the reference path P to be followed by the vehicle 100. The reference path P may, e.g., be determined based on map data and on a transport mission to be accomplished, as discussed above. The position x of the vehicle in relation to the path P may be determined using vehicle on-board sensors such as GPS receivers, radar transceivers, vision-based sensors, and the like. For instance, the TSM function 270 shown in FIG. 2 may desire to control the vehicle through a cornering maneuver associated with a given curvature. This curvature then determines the reference path P to be adhered to during the cornering maneuver.

The method also comprises determining S2 a goal point G along the path P to be used as a steering reference from a vehicle location x in vicinity of the path P, where the goal point G is distanced along the path P by a preview distance $D_p$ measured from a reference location x, $G_0$ associated with the vehicle location x. In case the method is being executed as part of controlling S31 the vehicle 100 according to a pure pursuit-based path following algorithm or similar, then the reference location x may simply equal the vehicle location. In case the method is being executed as part of controlling S32 the vehicle 100 according to a vector field guidance-based path following algorithm, then the reference location $G_0$ may be determined as a location on the path P intersected by a straight line 420 orthogonal to the path P at the reference location $G_0$ and passing through the vehicle location x, as exemplified in FIGS. 4A and 4B above. It is appreciated that more than one path following algorithm can be executed in parallel by the control units 130, 140, 150, e.g., for redundancy purposes.

The method is advantageously applied in performing S33 a Lane Keep Assistance (LKA) function. These functions may use vehicle on-board sensors such as cameras and radars to determine a geometry of a road ahead of the vehicle, and to determine the reference path P in dependence of this road geometry. The road geometry may, e.g., be determined from lane markings or the like in a known manner.

The methods disclosed herein are of course also applicable for semi-autonomous or autonomous drive of the articulated vehicle 100.

Notably, the preview distance $D_p$ is determined at least partly based on a lateral deviation y of the vehicle location x from the reference path P, such that the preview distance $D_p$ increases with an increasing lateral deviation y from the reference path P, and decreases with a decreasing lateral deviation y. This way the control effort is maintained even when the lateral deviation becomes small, which is a problem that has been known to affect previously proposed path following algorithms.

The method also comprises controlling S3 the vehicle 100 on the basis of the goal point G. It is appreciated that the path following algorithms disclosed herein may be applied for steering vehicle units other than the tractor 110. For instance, an articulated vehicle may comprise other steerable vehicle units, such as self-powered dolly vehicle units or powered trailers. These vehicle units may also be controlled according to the techniques disclosed herein. In particular, step S3 may include controlling the vehicle 100 towards the goal point G.

According to aspects, the method optionally comprises determining S21 the preview distance $D_p$ also at least partly based on a longitudinal velocity U of the vehicle 100, such that the preview distance increases with an increasing longitudinal velocity U. This means that a smoother vehicle control is configured in case the vehicle drives at high velocity, compared to when the vehicle is moving more slowly. Naturally, abrupt turning maneuvers are not desired at high velocity.

One or more tuning parameters may be introduced in the strategy for determining the preview distance. For instance, the method may comprise determining S22 the preview distance $D_p$ also based on a first tuning parameter a, wherein a control effort for controlling the vehicle 100 to follow the path P increases with an increase in the first tuning parameter a. Thus, this first tuning parameter a represents a means for adjusting the control effort of the path following algorithms that use the preview distance. Control effort generally refers to the magnitude of the vehicle motion management operations targeted at bringing the vehicle in closer adherence to the reference path P. For instance, a large control effort is more likely to generate higher vehicle lateral accelerations compared to a smaller control effort. The first tuning parameter a can advantageously be adjusted in dependence of a curvature of the reference path P. For instance, different path curvatures can be accounted for by determining S23 a centripetal lateral acceleration component associated with the reference path P at the reference location and adjusting the first tuning parameter a based on the centripetal lateral acceleration component.

The first tuning parameter may also be adjusted in dependence of a vehicle state or vehicle type, such as if the vehicle 100 is heavily laden or not, and perhaps also if the vehicle 100 has new tyres or not. The first tuning parameter may be configured from a remote entity such as the remote server 150, or by a technician during servicing. The driver may also configure the parameters manually in dependence of a personal preference or operating scenario.

Benefits can be obtained by adapting $D_p$ according to the curvature or mean curvature of the target path, e.g., to improve precision when manoeuvring in restricted spaces. This occurs indirectly via speed reduction, but further advantage can be achieved by adapting the acceleration parameter a according to an equation of the form $a=f(\kappa)$. Here $\kappa$ is any measure of curvature of the target path, and $f(\kappa)$ can be an increasing function, so that increased control effort is applied to path-following whenever greater precision is required. According to an example, the method comprises determining S24 the preview distance $D_p$ as $$D_p = \frac{Uy}{\sqrt{2ay+b}}$$

where U is the longitudinal velocity of the vehicle 100 (as indicated in FIG. 8), y is the lateral deviation, a is the first tuning parameter, and b≥0 is a second tuning parameter. Parameter b is an adjustment parameter, which can be used to control the behavior of the path following close to the target path. Parameter b, when greater than zero, may have an effect of reducing nonlinearity in the approach to the target path. The second tuning parameter b can be a configurable constant. Alternatively, the second tuning parameter b is a function of the longitudinal velocity U of the vehicle. In particular, the second tuning parameter is a quadratic function of the velocity, such as $$b = \left(\frac{\pi}{180}\right)^2 U^2,$$

The inventors have demonstrated that this choice of b causes the vehicle to enter the boundary region at a constant angle regardless of the longitudinal velocity.

A minimum distance may also be added to the preview distance determination, which lower bounds the preview distance, i.e., $$D_p = \max\left(\frac{Uy}{\sqrt{2ay+b}}, L_0\right)$$

This accounts for possible erratic steering when $$\frac{Uy}{\sqrt{2ay+b}}$$

becomes small, e.g., when speed U is very small or when path deviation magnitude y tends to zero. Use of $L_0$ reduces sensitivity to time delays in the steering actuator and takes account of the physical manoeuvring limitations of a large vehicle. Of course, other expressions f(·) for preview distance are also possible to lower bound in this manner.

Figures 10, 11:
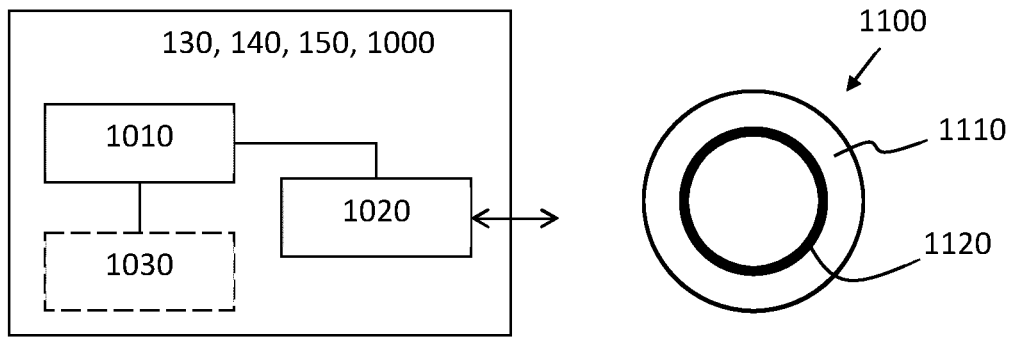
FIG. 10 schematically illustrates a control unit.
FIG. 11 shows an example computer program product.

FIG. 10 schematically illustrates, in terms of a number of functional units, the components of a control unit 130, 140, 150, 1000 according to embodiments of the discussions herein.

This control unit may be comprised in the vehicle 100, e.g., in the form of a VMM or TSM unit. Processing circuitry 1010 is provided using any combination of one or more of a suitable central processing unit CPU, multiprocessor, microcontroller, digital signal processor DSP, etc., capable of executing software instructions stored in a computer program product, e.g. in the form of a storage medium 1030. The processing circuitry 1010 may further be provided as at least one application specific integrated circuit ASIC, or field programmable gate array FPGA.

Particularly, the processing circuitry 1010 is configured to cause the control unit 1000 to perform a set of operations, or steps, such as the methods discussed in connection to FIG. 9.

Consequently, there is disclosed herein a control unit 130, 140, 150 for controlling a heavy-duty vehicle 100 to follow a reference path P. The control unit comprises processing circuitry 1010 configured to obtain the reference path P to be followed by the vehicle 100, determine a goal point G along the path P to be used as a steering reference from a vehicle location x in vicinity of the path P, where the goal point G is distanced along the path P by a preview distance $D_p$ measured from a reference location x, $G_0$ associated with the vehicle location x, where the preview distance $D_p$ is determined at least partly based on a lateral deviation y of the vehicle location x from the reference path P, such that the preview distance $D_p$ increases with an increasing lateral deviation y from the reference path P, and decreases with a decreasing lateral deviation y, and control the vehicle 100 on the basis of the goal point G.

For example, the storage medium 1030 may store the set of operations, and the processing circuitry 1010 may be configured to retrieve the set of operations from the storage medium 1030 to cause the control unit 1000 to perform the set of operations. The set of operations may be provided as a set of executable instructions. Thus, the processing circuitry 1010 is thereby arranged to execute methods as herein disclosed. In particular, there is disclosed a control unit 115, 210, 1000 for controlling reversal of an articulated vehicle 100, 300 comprising a tractor 110 and one or more towed vehicle units 120, 130, 140, 150, the control unit comprising processing circuitry 1010, an interface 1020 coupled to the processing circuitry 1010, and a memory 1030 coupled to the processing circuitry 1010, wherein the memory comprises machine readable computer program instructions that, when executed by the processing circuitry, causes the control unit to perform the methods discussed above in connection to FIG. 8.

The storage medium 1030 may also comprise persistent storage, which, for example, can be any single one or combination of magnetic memory, optical memory, solid state memory or even remotely mounted memory.

The control unit 1000 may further comprise an interface 1020 for communications with at least one external device. As such the interface 1020 may comprise one or more transmitters and receivers, comprising analogue and digital components and a suitable number of ports for wireline or wireless communication.

The processing circuitry 1010 controls the general operation of the control unit 1000, e.g., by sending data and control signals to the interface 1020 and the storage medium 1030, by receiving data and reports from the interface 1020, and by retrieving data and instructions from the storage medium 1030. Other components, as well as the related functionality, of the control node are omitted in order not to obscure the concepts presented herein.

FIG. 11 illustrates a computer readable medium 1110 carrying a computer program comprising program code means 1120 for performing the methods illustrated in FIG. 8, when said program product is run on a computer. The computer readable medium and the code means may together form a computer program product 1100.

The invention claimed is:

1. A method for controlling a heavy-duty vehicle to follow a reference path (P), the method comprising:
   obtaining the reference path (P) to be followed by the vehicle,
   determining a goal point (G) along the path (P) to be used as a steering reference from a vehicle location (x) in vicinity of the path (P), where the goal point (G) is located along the path (P) based on a preview distance ($D_p$) from a reference location (x, $G_0$) associated with the vehicle location (x) to the goal point (G),
   where the preview distance ($D_p$) is determined at least partly based on a lateral deviation (y) of the vehicle location (x) from the reference path (P), such that the preview distance ($D_p$) increases with an increasing lateral deviation (y) from the reference path (P), and decreases with a decreasing lateral deviation (y), and
   controlling the vehicle on the basis of the goal point (G).

2. The method of claim 1, wherein the controlling includes at least intermittently controlling the vehicle towards the goal point (G).

3. The method of claim 1, further comprising determining the preview distance ($D_p$) at least partly based on a longitudinal velocity (U) of the vehicle, such that the preview distance increases with an increasing longitudinal velocity (U).

4. The method of claim 1, comprising determining the preview distance ($D_p$) also based on a first tuning parameter a, wherein a control effort for controlling the vehicle to follow the path (P) increases with an increase in the first tuning parameter a.

5. The method of claim 4, where the first tuning parameter a is adjusted in dependence of a curvature of the reference path (P).

6. The method of claim 5, comprising determining a centripetal lateral acceleration component associated with the reference path (P) at the reference location, and adjusting the first tuning parameter a based on the centripetal lateral acceleration component.

7. The method of claim 1, comprising determining the preview distance ($D_p$) as $$D_p = \frac{U\,y}{\sqrt{2ay+b}}$$

where U is the longitudinal velocity of the vehicle (100), y is the lateral deviation, a is the first tuning parameter, and b≥0 is a second tuning parameter.

8. The method of claim 1, comprising determining the preview distance ($D_p$) as $$D_p = \max\left(\frac{U\,y}{\sqrt{2ay+b}}, L_0\right)$$

where U is the longitudinal velocity of the vehicle (100), y is the lateral deviation, a is the first tuning parameter, b≥0 is a second tuning parameter, and $L_0$ is a minimum preview distance.

9. The method of claim 8, wherein the second tuning parameter b depends on the longitudinal velocity U of the vehicle.

10. The method of claim 9, wherein the second tuning parameter is given by $$b = \left(\frac{\pi}{180}\right)^2 U^2.$$

11. The method of claim 1, comprising determining a direction w of a first flow field associated with the reference path (P) as $$w_1 = t_3 + \frac{t_1 - t_2}{2 \cos \theta}$$

where $t_1$ is a unit-length tangent vector to the reference path (P) evaluated at the reference location ($G_0$), $t_2$ is a unit-length tangent vector to the reference path (P) evaluated at the goal point (G), $t_3$ is a unit-length vector directed from the vehicle location (x) towards the goal point (G), and angle $\theta$ is half the angle between the two tangent vectors $t_1$ and $t_2$, wherein the vehicle is controlled according to the direction $w_1$ of the first flow field.

12. The method of claim 11, wherein the goal point is determined in accordance with a preview distance ($D_p$) for which no minimum preview distance $L_0$ is enforced.

13. The method of claim 11, wherein the vehicle is controlled in accordance with the direction $w_1$ of the first flow field when the lateral deviation (y) exceeds a threshold lateral deviation ($y_{max}$), and in accordance with a direction $w_2$ of a second flow field, wherein the second flow field has a weaker restoring action than the first flow field.

14. The method of claim 13, further comprising:
initially generating the second flow field by interpolating the first flow field and the tangent vector $t_1$ to the reference path (P) evaluated at the reference location ($G_0$).

15. The method of claim 14, wherein the second flow field is generated by interpolating the first flow field at the threshold lateral deviation ($y_{max}$) and the tangent vector $t_1$ evaluated at the reference location ($G_0$).

16. The method of claim 13, wherein the second flow field is generated in such manner that it tends asymptotically to the tangent vector $t_1$ evaluated at the reference location ($G_0$) as the lateral deviation (y) decreases to zero.

17. The method of claim 13, wherein the direction of the second flow field is given by $$w_2 = (\cos \Gamma, \sin \Gamma),$$

where $$\Gamma = \angle t_1 + \frac{|y|}{y_{max}} \angle w_1|_{y_{max}},$$

$\angle t_1$ is the orientation of the tangent vector evaluated at the reference location ($G_0$) and $\angle w_1|_{y_{max}}$ is the orientation of the first flow field evaluated for the threshold lateral deviation ($y_{max}$).

18. The method of claim 1, comprising controlling the vehicle according to a pure pursuit-based path following algorithm, where the reference location (x) equals the vehicle location.

19. The method of claim 1, comprising controlling the vehicle according to a vector field guidance-based path following algorithm, where the reference location ($G_0$) is a location on the path (P) intersected by a straight line orthogonal to the path (P) at the reference location ($G_0$) through the vehicle location (x).

20. The method of claim 1, wherein controlling the vehicle comprises performing a Lane Keep Assistance function, a semi-autonomous drive application, or an autonomous drive application.

21. A control unit for controlling a heavy-duty vehicle to follow a reference path (P), the control unit comprising processing circuitry configured to:
obtain the reference path (P) to be followed by the vehicle,
determine a goal point (G) along the path (P) to be used as a steering reference from a vehicle location (x) in vicinity of the path (P), where the goal point (G) is located along the path (P) based on a preview distance ($D_p$) from a reference location (x, $G_0$) associated with the vehicle location (x) to the goal point (G),
where the preview distance ($D_p$) is determined at least partly based on a lateral deviation (y) of the vehicle location (x) from the reference path (P), such that the preview distance ($D_p$) increases with an increasing lateral deviation (y) from the reference path (P), and decreases with a decreasing lateral deviation (y), and
control the vehicle on the basis of the goal point (G).

22. A heavy-duty vehicle comprising the control unit of claim 21.

* * * * *